United States Patent

Petruzzi et al.

Patent Number: 6,049,811
Date of Patent: Apr. 11, 2000

[54] MACHINE FOR DRAFTING A PATENT APPLICATION AND PROCESS FOR DOING SAME

[76] Inventors: James D. Petruzzi; Robert M. Mason, both of 13760 Noel, #820, Dallas, Tex. 75240

[21] Appl. No.: 08/756,444

[22] Filed: Nov. 26, 1996

[51] Int. Cl.[7] .................................................... G06F 17/21
[52] U.S. Cl. ............................................................. 707/507
[58] Field of Search .................................... 707/517–529, 707/507; 705/1

[56] References Cited

U.S. PATENT DOCUMENTS 5,623,681  4/1997  Rivette et al. ......................... 707/522

OTHER PUBLICATIONS

Pressman, Patent It Yourself, p. 8/1–8/20, Aug. 1996.

Pressman, Software Engineering, A Practioner's Approach, p. 98–111, 1982.

*Primary Examiner*—Anton Fetting

[57] ABSTRACT

A machine and method for drafting a patent application has a keyboard, mouse, display, printer, and a computer for receiving and transmitting data. The computer requests and stores information regarding the invention including, if appropriate: 1) qualities and benefits (QAB) of the invention over the prior technology; 2) primary elements (PE) of the invention that define the invention apart form prior technology; 3) secondary elements (SE) of the invention that may be important but not necessary to define over the prior technology; and 4) substitute elements (SUB) of the invention that may substituted or modified in an effort to avoid the primary and secondary elements but not depart from the invention. The QAB are requested and stored before the objects of the invention are drafted, the PE are requested and stored before the independent claims are drafted, the SE and SUB are requested and stored before the dependent claims are drafted, the independent claims are drafted before the summary of the invention is drafted, the independent claims are drafted before the dependent claims are drafted, the dependent claims are drafted before the abstract of the disclosure is drafted, and all claims are drafted before the detailed description of a preferred embodiment is drafted. The sections are drafted in a predetermined order prohibiting jumping ahead to draft a later section. At many sections, initial draft text, examples, samples, legal material, etc. are available to the user. A final patent application is compiled by combining the drafted sections with predetermined text.

18 Claims, 4 Drawing Sheets

MACHINE FOR DRAFTING A PATENT APPLICATION AND PROCESS FOR DOING SAME

BACKGROUND OF THE INVENTION

This invention relates generally to the field of inventions, and more particularly to a machine for drafting a patent application and process for doing same.

Applications for patents to protect inventors' ideas are filed with the United States Patent and Trademark Office and with other patent offices throughout the word. Traditionally, an inventor seeks the assistance of a trained patent application draftsperson—either a patent attorney or patent agent in the United States or the equivalent in foreign countries. Without a patent application on file with the Patent Office, the laws do not allow the term patent pending or similar indicia to be placed on a product anticipated to be covered by a patent. The term patent pending is considered of importance as it conveys the patent status to potential copiers and the public. Further, many companies otherwise interested in licensing rights to manufacture from the inventor are unwilling to recognize the inventor's creative contribution in the form of payment unless an application for patent has been made to the patent office.

Patent applications have been drafted and submitted to the Patent Office on behalf of inventors by patent attorneys and patent agents since the first person was certified to act on behalf of an inventor by the U.S. Patent Office on Aug. 3, 1894. Before that time and since, inventors have also represented themselves and prepared their own patent applications to the Patent Office.

Patent attorneys, patent agents and individual applicants have a variety of methods for application drafting. In addition, there are a number of books available on patent law, patent office practice, patent examiners' procedure and even the drafting of patent applications. Further, there is a computer software application designed to assist the individual inventor in preparing a patent application entitled *Patent It Yourself* available from Nolo Press in California.

Patent attorneys and patent agents charge the inventor a substantial amount of money for the attorney's or agent's education, experience, and knowledge in application drafting. Often, this amount of money exceeds many thousands of dollars and is cost prohibitive for the inventor. If the inventor's expense is paid for by a corporation for one reason or another, such as an obligation to assign the invention to the corporation, the corporation's expense may be unduly burdensome when multiplied by the number of inventions on which it wishes to file applications for patent protection, in which case patent protection may not be sought for all inventions.

Further, there are problems inherent in the application process based on the inventor trying to teach the attorney or agent sufficient information concerning the invention so that proper depth and breadth of protection is sought through application for patent. It is often only after a patent has been issued and is litigated in a court of law that it comes to light that the inventor contemplated aspects of the invention that the attorney or agent failed to realize, failed to appreciate the importance of, or failed to solicit from the inventor, resulting in the aspect(s) of the invention being left unprotected—and that may be the very aspect over which an otherwise illegal copier is able to avoid liability.

The books on patent law, patent office rules and regulation, and patent examining procedure do little to help an inventor prepare a patent application. The patent application drafting books fall into two categories: 1) those written for attorneys and agents; and 2) those written for the lay person. The books written for the lay person (often written by attorneys or agents) make the explanation of drafting a patent application so difficult and involved that the lay person often throws up his or her hands in frustration and contacts the author of the book to draft the application. In addition, the books currently available include information unnecessary to the drafting of the patent application, such as patent prosecution, licensing, foreign prosecution, invention marketing, etc. Moreover, even if the inventor segregated the application information and tried to understand the application process from the book, without experience and training, certain sections of the patent application are perceived to be easier to draft than other sections. The average draft-it-yourself inventor is often too tempted to skip first to the perceived easier sections and later return to the others. This procedure using a book all too often results in an application unsuitable for filing with the Patent Office. Of course, the books written for the patent attorney or agent are often far to detailed for the inventor's needs and contain extraneous information not necessary for the patent application drafting.

The computer software designed for the draft-it-yourself inventor suffers from the same shortcomings: difficult for the inventor to understand the essentials of drafting a patent application; and the ability to skip from section to section in no set order resulting in an unsuitable application. Further no method of analysis is provided to the inventor for developing the proper understanding of his invention for purposes of the application.

SUMMARY OF THE INVENTION

The primary object of the present invention is to provide an improved computer based machine to aid in drafting a patent application.

Another object of the invention is to provide an interactive, computer machine that prompts a user for appropriate information useful in drafting a application for letters patent.

Another object of the invention is to provide a method of preparing a patent application that is sequentially based one section upon another.

A further object of the invention is to provide a method and machine to aid in preparing an application for letters patent that significantly reduces and may even avoid the expense of employing a patent attorney or agent.

Yet another object of the invention is to provide a machine and method for patent application preparation that avoids the necessity to educate a third party of the substance of an invention.

Still yet another object of the invention is to provide a machine and method for patent application preparation that does not require significant knowledge of substantive patent law.

Another object of the invention is to provide a machine and method for patent application preparation that automatically incorporates legal requirements without the need to consult a patent attorney or patent agent.

Another object of the invention is to provide easier and cheaper access to the patent office while reducing or avoiding the need of a patent attorney or patent agent.

A further object of the invention is to provide easy and inexpensive access to patent pending status for an inventor.

Yet another object of the invention is to provide a method of analyzing and presenting an invention in the form appropriate for filing with the Patent and Trademark Office.

Still yet another object of the invention is to provide a computer based machine to aid in drafting a patent application that automatically drafts portions of a patent application based upon user input.

Other objects and advantages of the present invention will become apparent from the following descriptions, taken in connection with the accompanying drawings, wherein, by way of illustration and example, an embodiment of the present invention is disclosed.

In the preferred embodiment, a machine for drafting a patent application comprises an input device such as a keyboard or mouse, an output device such as a display or printer, and a computer for receiving data from the input devices and for transmitting data to the output devices. The computer also stores program steps for program control and manipulates data in memory. The machine also requests and stores information regarding the invention including, if appropriate: 1) qualities and benefits (QAB) of the invention over the prior technology; 2) primary elements (PE) of the invention that define the invention apart form prior technology; 3) secondary elements (SE) of the invention that may be important but not necessary to define over the prior technology; and 4) substitute elements (SUB) of the invention that may substituted or modified in an effort to avoid the primary and secondary elements but not depart from the invention. The QAB are requested and stored before the objects of the invention are drafted, the PE, SE, and SUB are requested and stored before the claims are drafted, the claims are drafted before the summary of the invention, the abstract of the disclosure, and the detailed description of a preferred embodiment are drafted. Drafting the sections is in a predetermined order disallowing for jumping ahead to draft a later section.

In a preferred embodiment, a process for drafting a patent application comprises the steps of inputting data into a computer through a device such as a keyboard an mouse, and outputting data through a device such as a display or printer. The computer also is for storing program steps for program control and manipulating data in memory, including requesting and storing information regarding the invention including, when appropriate: 1) qualities and benefits (QAB) of the invention over the prior technology; 2) primary elements (PE) of the invention that define the invention apart form prior technology; 3) secondary elements (SE) of the invention that may be important but not necessary to define over the prior technology and; 4) substitute elements (SUB) of the invention that may substituted or modified in an effort to avoid the primary and secondary elements but not depart from the invention. The QAB are requested and stored before the objects of the invention are drafted, the PE, SE and SUB are requested and stored before the claims are drafted, the claims are drafted before the summary of the invention, the abstract of the disclosure, and the detailed description of a preferred embodiment are drafted. Drafting the sections are done in a predetermined order disallowing for jumping ahead to draft a later section.

In a preferred embodiment, a system for describing an innovation comprises at least an input to a computer memory for storage of information regarding a plurality of sections of a technical description, means for functionally linking said sections to one another in a predetermined fashion, output from a computer of each of said sections for revision by a user, storage of each revised section in said memory, means for compiling said sections in a predetermined order, and output from the computer of said compiled sections.

The drawings constitute a part of this specification and include exemplary embodiments to the invention, which may be embodied in various forms.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is anticipated that the preferred embodiment of the present invention will be a commercial product sold under the trade name PatentPro™ to be used with the Windows '95™ or Windows NT™ operating system being run on an Intel™ Pentium™ processor, though modifications to particular operating systems and processors would be evident and not be beyond the present invention. Accordingly, the trade name will be referred to throughout this detailed description as the entire software program, the machine for implementing the program and the specific portion of the program and machine dedicated to the drafting of a patent application. The context of the term PatentPro™ will make obvious the intended reference.

Figure 1:
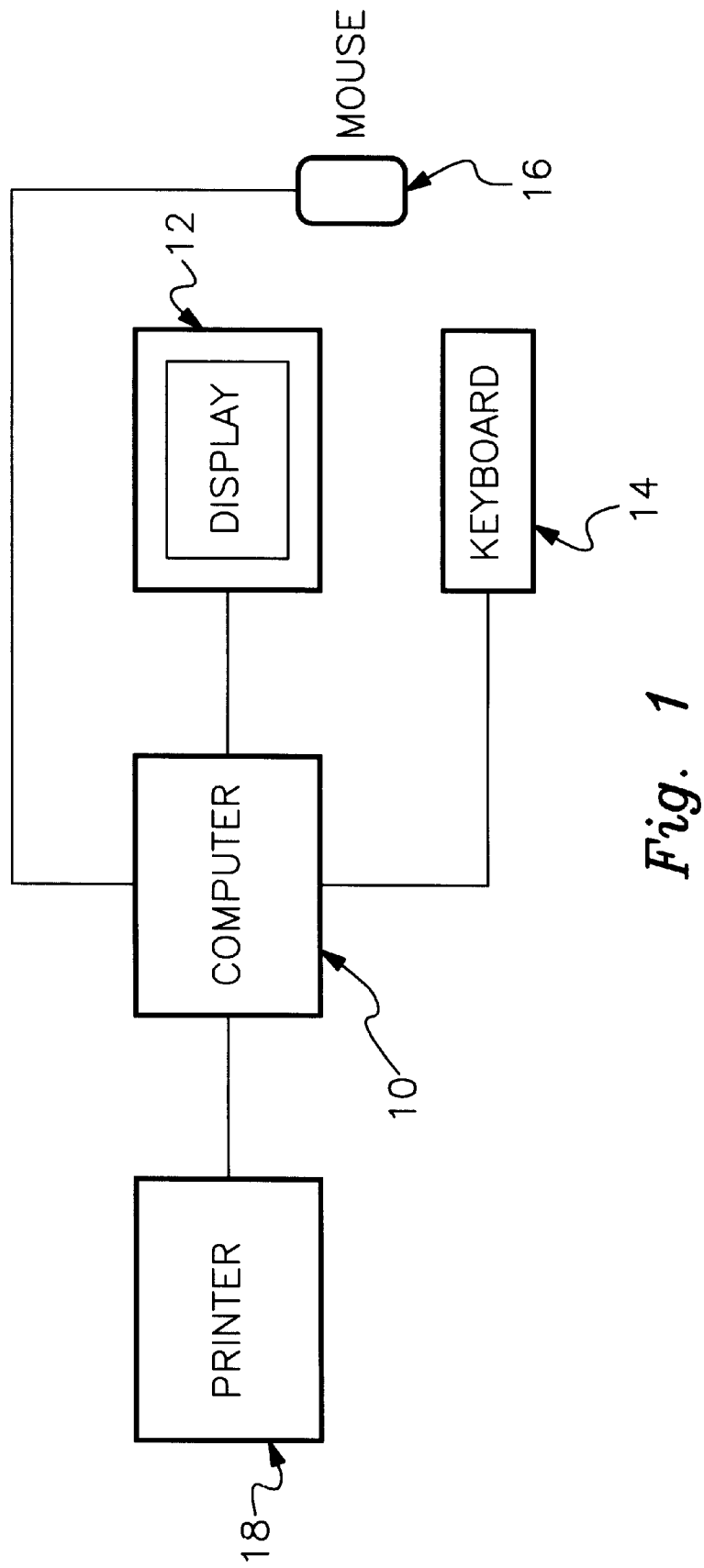
FIG. 1 is a schematic diagram of a machine to implement the present invention.

Turning now to FIG. 1, there is shown an apparatus for carrying out the preferred embodiment of the invention. A computer 10 of the traditional type including ROM, RAM, a processor, etc. is shown operatively connected by wires to a display 12, keyboard 14, mouse 16 and printer 18, though a variety of connections means and input and output devices may be substituted without departing from the invention. The processor operates to control the program within the computer 10, and receive and store data from the input devices and transmit data to the output devices. Notebook computers of similar configuration (ROM, RAM, processor, etc.), can be used as well.

Figure 2:
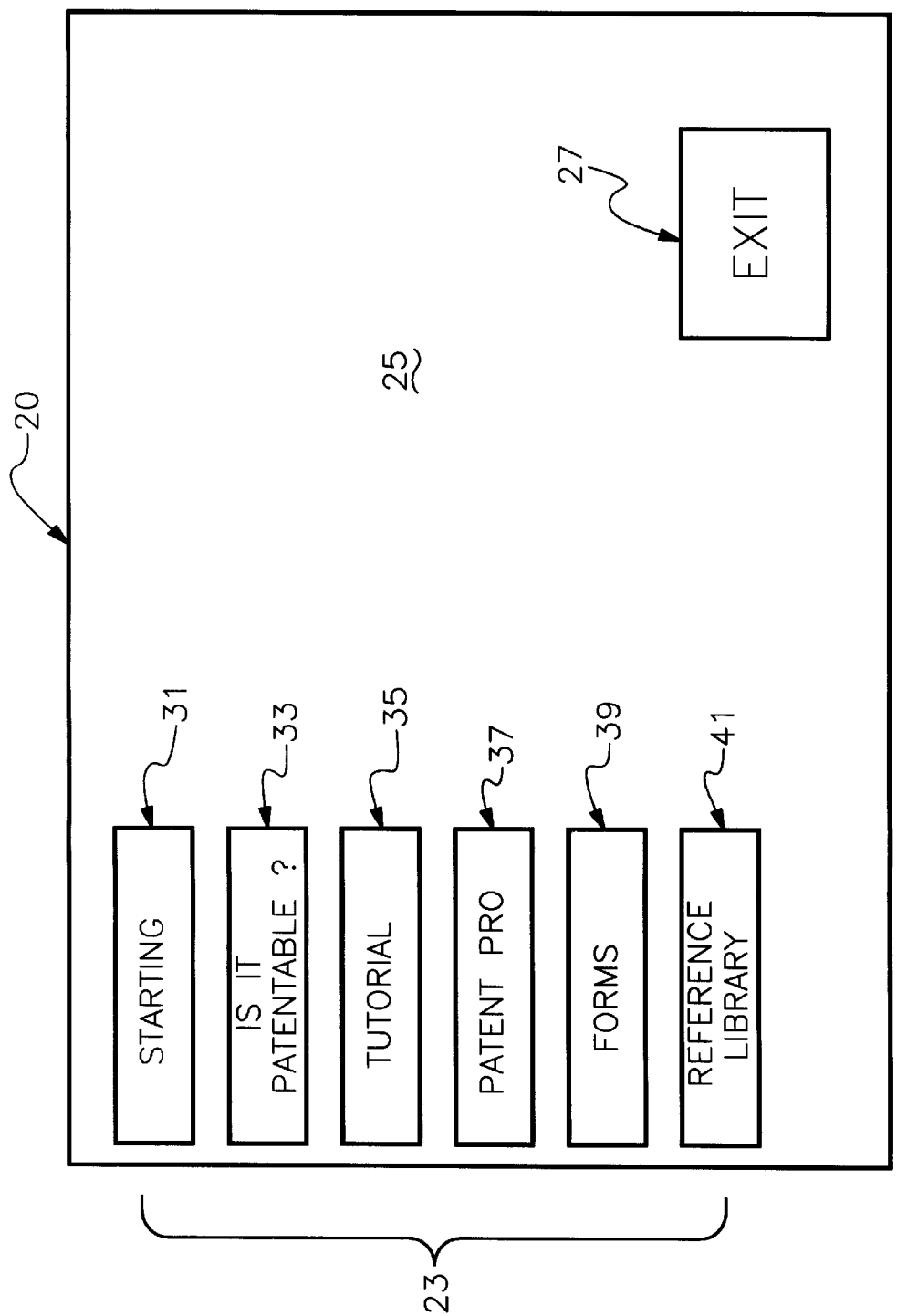
FIG. 2 is a representation of a computer screen in the illustrated embodiment of the invention representing a table of contents.

Upon initiating the program, which may take place in a variety of conventional ways and is not part of the present invention, the computer 10 causes to be displayed on display 12 a figure 20 substantially as shown in FIG. 2. FIG. 2 is likened to a Table of Contents in which a number a chapters represented through button figures 23 may be selected. It will be understood that the selection of a chapter or subject matter may be of a variety of selection means. In the preferred, commercial embodiment of the package PatentPro™, the chapter buttons 23 are the following, each to be explained in more detail below: Starting 31; Is It Patentable? 33; Tutorial 35; PatentPro™ 37; Forms 39; and Reference Library 41. In addition, there is expected a splash screen figure 25 which may be a variety of graphical representations, not the subject of the present invention, and an Exit button 27 useful in exiting PatentPro™.

Upon selecting Starting 31 by a variety of means, such as positioning a cursor over the button and clicking with a mouse button or selecting and depressing the Enter key on the keyboard, information such as Introduction to PatentPro™, Frequently Asked Questions, and Other Forms of Protection may be accessed through, for example a well known help system. Introduction to PatentPro™ may provide helpful information to an inventor regarding the use of PatentPro™, while Frequently Asked Questions may provide the questions and answers to general information concerning intellectual property, and patents in particular. Other Forms of Protection may provide information regarding intellectual property such as trademarks, service marks, copyrights, trade dress, and trade secrets, design patents, plant patents, provisional patent applications, and the U.S. Patent Office's document disclosure program, to name a few.

Upon selecting Is It Patentable? 33 by a variety of means, such as positioning a cursor over the button and clicking with a mouse button or selecting and depressing the Enter key on the keyboard, information such as What can be Patented?, the New, Useful, and Non-obvious requirements, Avoiding Pitfalls, and Patent Searching may be accessed. What can be Patented? may provide information regarding the statutory classes of inventions allowable under the laws, while the New, Useful, and Non-obvious requirements may provide the legal requirements for patentability, for example though a presentation of Sections 101, 102, and 103 of Title 35 of the United States Code. Avoiding Pitfalls may more particularly point out the common mistakes that inventors often make that jeopardize the patentability of their inventions either in the United States or in other countries, and Patent Searching may present information useful in searching prior technology or patents in an effort to determine whether the inventor's invention is new, useful, and non-obvious, such as sources for searching patents and prior technology.

Upon selecting Tutorial 35 by a variety of means, such as positioning a cursor over the button and clicking with a mouse button or selecting and depressing the Enter key on the keyboard, a tutorial for the patent application drafting portion of the machine may be accessed. The tutorial may be presented in a variety of fashions, such as by video, audio, still graphics, or a combination, sufficient to familiarize with the machine and method of drafting a patent application as later presented.

Operation upon selecting PatentPro™ 37 will be discussed in detail below.

Upon selecting Forms 39 by a variety of means, such as positioning a cursor over the button and clicking with a mouse button or selecting and depressing the Enter key on the keyboard, a number of legal forms useful in patent application drafting and submission to the U.S. Patent Office are provided. These forms may include a draft cover letter transmitting the patent application and associated papers to the Patent Office, a fee calculation form for calculating the proper fees necessary for submitting the patent application, an oath or declaration, a small entity status form, a recordation of assignment form, etc. In addition, it is contemplated that forms useful in dealing with industry may be provided including nondisclosure or confidentiality forms, and assignment forms. Further, PTO Form 1449 for submitting information in the form of patents, publications, etc. is provided. In accordance with an aspect of the invention, a machine and method for preparing an information disclosure statement is provided. The machine and method is similar to the machine and method described below with respect to the Background 120 section. Through the use of a wizard, the operator is prompted for references, a brief description of each reference, and the relevance of each reference with respect to the invention. After the information is inputted, the computer 10 automatically generates a first draft information disclosure statement by adding appropriate phrases and formatting, allowing the operator to complete the information disclosure statement.

Upon selecting Reference Library 41 by a variety of means, such as positioning a cursor over the button and clicking with a mouse button or selecting and depressing the Enter key on the keyboard, the full text of Title 35 of the United States Code, Title 37 of the Code of Federal Regulations and the Manual of Patent Examining Procedure may be provided if a variety of forms such as a help file format. Further, and in accordance with another aspect of the invention, issued patents may be available. In the preferred embodiment, there are nine categories of inventions including Communications, Electrical Components and Circuitry, Electrical Systems, Pharmaceutical, Chemical, Medical Devices, Agricultural, Transportation, and Photography. Upon selecting issued patents, the nine categories would be presented; upon choosing any category, a listing of inventions pertaining to the selected category is presented. Once a patent is selected, the full text and drawings of the patent is presented on display 12 and may be printed on printer 18. In the preferred embodiment, the issued patents are selected from the patents listed in the Inventor's Hall of Fame inductees and may be updated each year, or as desired. Further, each page of each patent is available as a .tif file, though a variety of files may be used including a text file for the text of each patent. Once a patent page is displayed, an interface of known kind may be shown to allow paging forward or backward within each patent.

Figure 3:
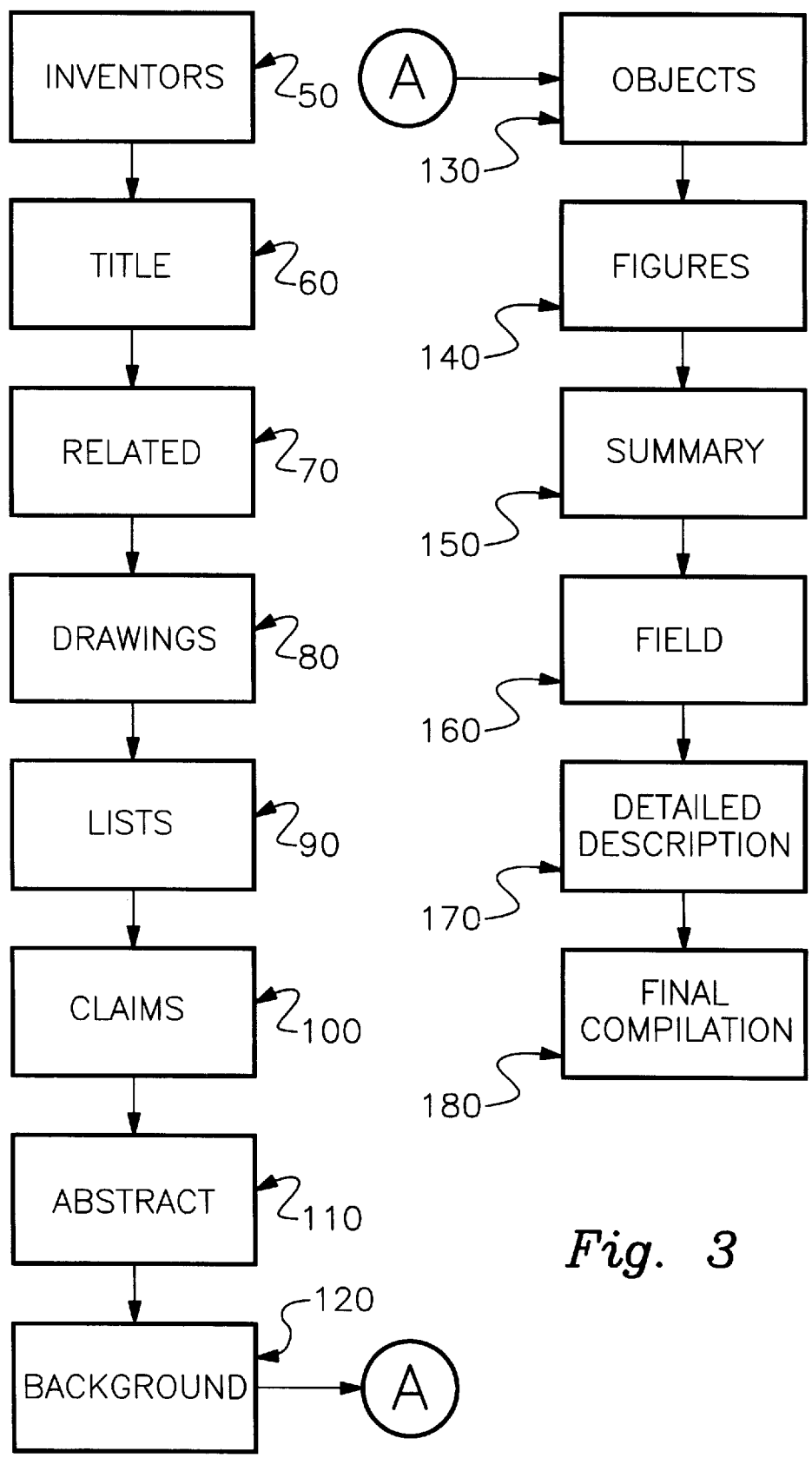
FIG. 3 is a flow chart of the patent application sections in the order drafted in the illustrated embodiment of the invention.

Upon selecting the button PatentPro™ 37, the machine and method for drafting a patent application becomes evident. The user is the presented with options to review introductory remarks intended to help the user with PatentPro™ and the portion for drafting applications for patent, to continue drafting an earlier application from the point at which the user left off previously, or to begin drafting a new application for patent. The machine and apparatus will be evident from a description of drafting a complete application from start to finish. In particular, and with reference to FIG. 3, the user will be led through in a step-by-step fashion sections of a patent application to result in an application for patent as those are accepted for filing in the U.S. Patent Office and suitable for filing in many foreign country patent offices. Particularly, in the embodiment shown, the sections of the patent applications and in the order of drafting those sections are as follows: Inventors 50; Title 60; Related Applications 70; Drawings 80; Claims 100; Abstract 110; Background 120; Objects 130; Figures 140; Summary 150; Field 160; and Detailed Description 170. In addition, another section is drafted, though not a required or suggested for submission to the Patent Office, identified as Lists 90. The Lists 90 section is to be drafted after Drawings 80 and before Claims 100. Each section will be described in detail below. The order in which the sections are presented and drafted may vary, though in accordance with an important aspect of the invention, the program requests and stores information regarding the Lists 90 including, if appropriate: 1) qualities and benefits (QAB) of the invention over the prior technology; 2) primary elements (PE) of the invention that define the invention apart form prior technology; 3) secondary elements (SE) of the invention that may be important but not necessary to define over the prior technology; and 4) substitute elements (SUB) of the invention that may be substituted or modified in an effort to avoid the primary and secondary elements but not depart from the invention. The QAB are requested and stored before the Objects 130 of the invention are drafted, the PE are requested and stored before the independent claims, part of Claims 100, are drafted, the SE and SUB are requested and stored before the dependent claims, part of Claims 100, are drafted, the independent claims are drafted before the Summary 150 of the invention is drafted, the independent claims are drafted before the dependent claims are drafted, the dependent claims are drafted before the Abstract 110 of the disclosure is drafted, and all Claims 100 are drafted before the Detailed Description 170 of a preferred embodiment is drafted. The sections are drafted in a predetermined order prohibiting jumping ahead to draft a later section.

Upon selecting a new patent application to draft, the user is presented with the first section Inventor 50. In the preferred embodiment, the processor in computer 10 causes to be displayed at display 12 information, primarily textual in nature, and sometimes referred to as a dialogue box, (though also may be audio, visual, or a combination thereof), regarding the requirements to be a named inventor on a patent application and perhaps related information such as the duty of candor owed by inventors to the Patent Office. Upon reading the information, a user would continue and be presented with an interface designed to prompt for the number of inventors, and their respective names. Upon verifying the inventor information as correct, the computer 10 stores the information and presents the user, through display 12, information reminding the user of the requirements to be a named inventor and allowing the user to go back and revise the inventor information, if necessary.

Upon completing inventor information, the computer 10 causes to be presented at display 12 introductory material, primarily textual in nature, regarding the Title 60 section. This information may include the statutory classes of invention as referred to in 35 U.S.C. §101, as well as an explanation of each class, and combinations thereof. Examples of proper titles may also be given. After reading the introductory material within Title 60 section, the user is then presented with a display showing options for selecting a class or combination of classes for the invention. The computer 10 stores the selected class information and displays at display 12 a suggested title of the invention incorporating the class or combination of classes chosen, along with blanks indicating to the user that a descriptive title is to be inserted at the appropriate place.

Figure 4:
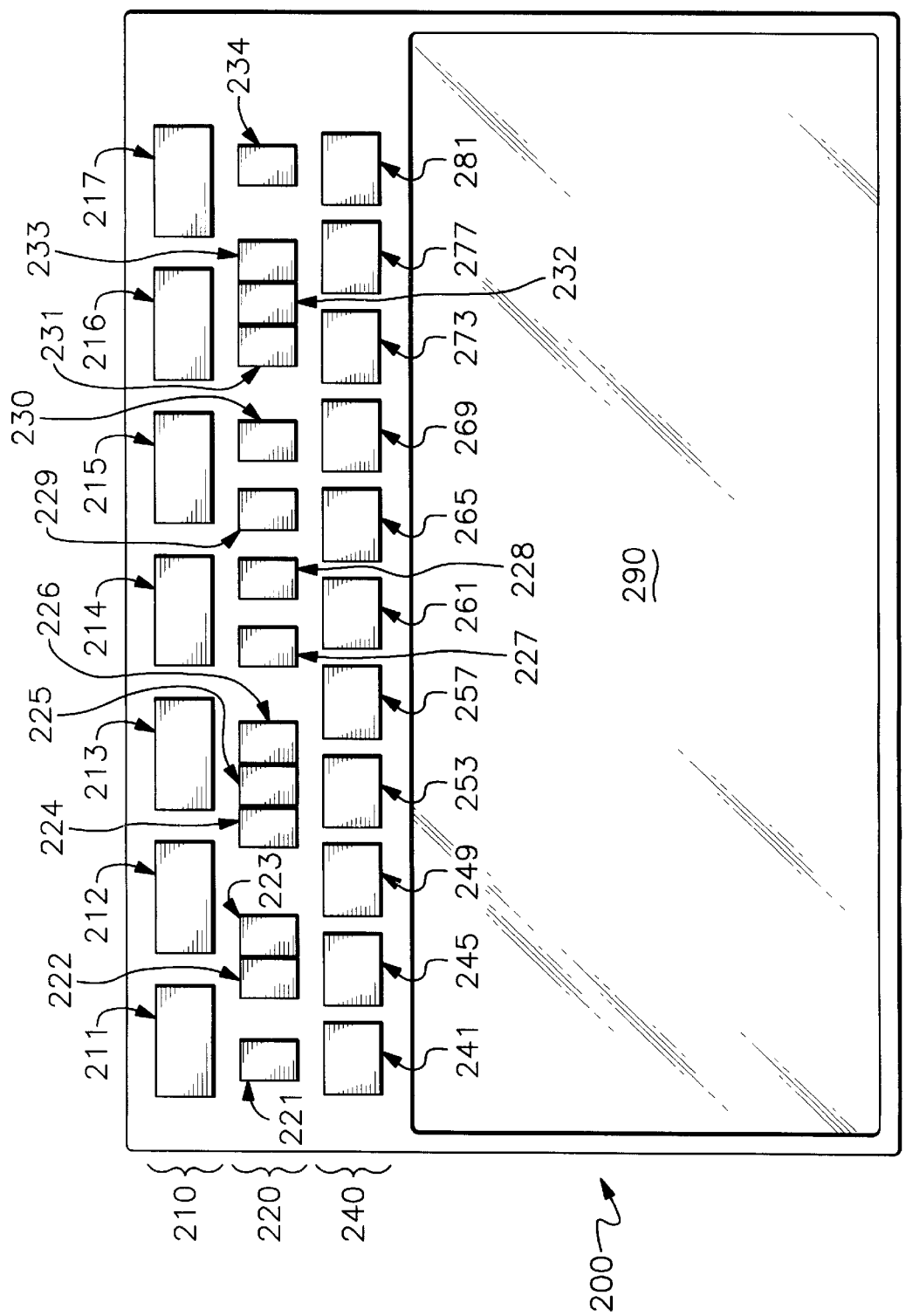
FIG. 4 is a representation of a computer screen in the illustrated embodiment of the invention representing an interface with the user in any of a number of patent application sections.

A typical display for drafting information for many of the sections of the patent application is illustrated at FIG. 4. The display where the user is to input data will be referred to as the drafting screen 200, and will appear in many of the sections of the patent application. To aid the user in drafting a patent application and the particular section the user is currently drafting, the drafting screen 200 is equipped with a menu bar 210, toolbar 220, action bar 240, and drafting area 290, the operation and purpose of each will be described in more detail below.

The menu bar 210, in the preferred embodiment, includes the following options: File 211; Edit 212; Format 213; Action 214; View 215; Window 216; and Help 217. By selecting in a conventional manner File 211, the following options are available: new; open; close; save; print; print set up; and exit; each of which operate in a conventional manner and similar to other software applications currently available. By selecting in a conventional manner Edit 212, the following options are available: undo; cut; copy; paste; find; find next; replace and spell check; each of which operate in a conventional manner and similar to other software applications currently available. By selecting in a conventional manner Format 213, the following options are available: bold; italics; underline; format paragraph, font/superscript, subscript . . . ; and insert page break; each of which operate in a conventional manner and similar to other software applications currently available. By selecting in a conventional manner Action 214, the following options are available: previous section; patent examples; sample phrases; technical terms; add-a-claim; show lists; show claims; detailed description method review; legal materials; to beginning of section; and to section checklist; each of which can be operated from the action bar 240, and will be explained in more detail below. By selecting in a conventional manner View 215, the following options are available: toolbar; action bar; status bar; special characters and previous draft. The toolbar, status bar and action bar operate in a toggle mode to show or hide the respective bars (in the preferred embodiment, a status bar is provided indicative of the purpose of the icon in the toolbar 220 or action bar 240, over which a cursor is positioned). Upon selecting the special characters the operator is presented with the ASCII character set, if available, in the currently used font. Upon selecting the previous draft, the user is shown the information previously drafted for the section in which the user is presently drafting a patent application section, the operation of which will become clearer upon the understanding of the function of the previous section operation from the action bar 240. By selecting in a conventional manner Window 216, the following options are available: cascade; tile; arrange icons; and a term indicative of the patent application section in which the operator is drafting; each of which operate in a conventional manner and similar to other software applications currently available. By selecting in a conventional manner Help 217, the following options are available: index; using help; and about PatentPro™; each of which operate in a conventional manner and similar to other software applications currently available.

The toolbar 220, in the preferred embodiment, includes icons for creating a new document 221; opening a file 222; saving a file 223; cutting to a clipboard selected material 224; copying to a clipboard selected material 225; pasting into a file the contents of a clipboard 226; sending a document or file to a printer 227; checking the spelling of words 228; undoing the last operation 229; finding information with selected criteria 230; bolding selected data 231; italicizing selected material 232; and underlining selected material 233; each of which operate in a conventional manner and similar to other software application currently available. In the preferred embodiment, the toolbar 220 also includes a safe 234 icon, which, upon selecting, will cause to be displayed the last version of the section the operator is currently drafting. The use of the this icon will become evident below.

The action bar 240, in the preferred, illustrated embodiment, includes graphical icons for the following functions: accessing a previously drafted section, either for viewing or for modifying that section 241; accessing examples of the current patent application being drafted based on issued patents 245; accessing sample phrases useful in drafting whatever patent application section is being drafted currently 249; presenting a listing of technical terms 253; help in adding a claim and properly imbedding the added claim 257; accessing previously drafted Lists 90 from analyzing the invention 261; accessing previously drafted Claims 100 for the patent application 265; reviewing a method for drafting the detailed description section 170 of the patent application 269; accessing the legal materials relevant to the patent application section the operator is currently drafting 273; going to the beginning of the current section to access the introductory materials for that section 277; and going to the next section through a checklist for the patent application section currently being drafted 281; not all of which may be active and accessed in each patent application section being drafted.

Returning now to the operation of the machine and flow of the method for drafting a patent application, when presented with the drafting screen 200 for the Title 60 section, the Patent Examples 245, Sample Phrases 249, Legal Materials 273, To Introduction 277, and To Next Section 281 icons are active. Upon selecting Patent Examples 245, there is shown at display 12, nine categories of inventions as described above with reference to the appendix of issued patents, and upon the operator selecting a category, a list of inventions is displayed. Upon selecting an invention, example titles derived from issued patents are displayed. At the same time as titles from patents as examples are displayed, in the preferred, illustrated embodiment, the operator may also access other sections of the same example patent to begin to understand the interconnection of the various patent application sections. It will be appreciated at this point that the patent examples may not be based on patents from the Inventors' Hall Of Fame, and may not be based on issued patents at all. The purpose of the Patent Examples 245 is to provide the operator with examples from which they may draft their own patent application section.

Upon selecting Sample Phrases 249, there is show at display 12 a number of statutory classes of invention and combinations thereof in a similar fashion to that described above following the display of the introductory material, with similar operation. That operation is to, once a sample phrase is selected, introduce that phrase with an indication of the place for modification at the drafting area 290 on the drafting screen 200 to complete the Title 60 section.

Upon selecting Legal Materials 273, there is shown at display 12 the sections from Title 35 of the United States Code (35 U.S.C.), Chapter 37 of the Code of Federal Regulations (37 C.F.R.), and the Manual of Patent Examining Procedure (M.P.E.P.) applicable to the title of a patent application.

Upon selecting To Introduction 277, the operator is presented with the introductory remarks for the Title 60, from which the operator may continue on to the drafting screen 200 for the title with or without being first show the sample phrases 249 information, at which point the operator is presented with the information previously inputted at the drafting area 290 to continue with the machine and method for drafting a patent application.

Upon selecting To Next Section 281, the computer causes to be displayed at display 12 final checklist information, primarily textual in nature, indicative of what the user should have completed in the Title 60 section. This final checklist display, in the preferred embodiment, allows for three choices from the operator: to go back to the drafting screen 200 for the Title 60 section allowing for modification of the previously inputted information; saving the theretofore inputted information and being presented with the Table of Contents display; or continuing to the next section, Related Applications 70. Returning to the drafting screen 200 operates in a similar fashion to that described above. Accessing the Table of Contents display also operates as described above. Continuing to the next section, causes the computer 10 to save the operators input and causes to be displayed information, primarily textual in nature, regarding what is intended in the patent laws to be a related patent application.

After reading the introductory information regarding related patent applications, the operator is allowed to skip over drafting this section, as it is contemplated that many of the intended operators will not need to draft a section pertaining to pending related patent applications. However, in the event the operator chooses to draft a Related Application 70 section, the computer 10 causes to be displayed at display 12, a number of typical, sample phrases often used in one form or another to describe the relationship between the patent application currently being drafted and any pending related patent application. Upon selecting a sample phrase, the computer 10 causes that phrase to appear in the drafting area 290 in the drafting screen 200 available for editing by the operator. In the drafting screen 200 of the Related Applications 70 section, the Previous Section 241, Sample Phrases 249, Legal Materials 273, To Introduction 277, and To Next Section 281 icons are active.

Upon selecting the Previous Section 241 icon, the operator is presented with a list of sections previously drafted in the current patent application. In the preferred embodiment, the operator may select any previously drafted patent application section, except for the inventor information 50, and may either view that section without the ability to modify the data in that section or may view the section allowing the modification of data in the section. In the event viewing only is selected, the chosen section is caused to be presented on the display 12, either at the same time as the information of the current section is displayed or in place thereof. In the event the modify option is selected, the computer causes to be stored all theretofore drafted information and presents the operator with the introductory materials of the selected section. The previously drafted information from that patent application section may be accessed by selecting the Safe 225 icon from the toolbar 220 or by selecting the Previous Draft from View 226 in the menu 210. Once in a patent application section drafting area 290, the operator may only proceed as described above. In particular, the operator may proceed from one section to the next in the previously described operation and order, though the operator my jump back to any previous section, i.e., the machine and method allows for jumping backwards, but only stepping forwards.

Upon selecting the Sample Phrases 249 icon, a display similar to that previously described showing typical sample phrases useful in describing the relationship between the currently drafted application and any previous pending or abandoned applications is provided at display 12 and operates in a similar fashion to that described above.

In accordance with the preferred embodiment, upon selecting the Legal Materials 273 icon, there is caused to be displayed at display 12 the portions of 35 U.S.C., 37 C.F.R., and the M.P.E.P. applicable to the section of a patent application whereat related applications are disclosed, in a similar fashion as to that described above regarding the Title 60 section. Upon selecting the To Introduction 277 icon, the computer 10 causes to be displayed at display 12, the introductory information, primarily textual in nature for the Related Applications 70 section to remind the operator the requirements of the related patent application section, in a similar fashion to that described regarding the Title 60 section. Also in a similar fashion as described with regard to the Title 60 section, operating the To Next Section 281 icon causes to be displayed at display 12, a checklist for the Related Applications 70 section to remind the operator the requirements of related patent application section, and allows the operator to return to the drafting screen 200 for the Related Application 70 section, save the theretofore work and be shown the Table of Contents or proceed to the next section in the machine and method for drafting a patent application.

Upon continuing to the next section, the computer 10 causes to be displayed at display 12 introductory information, primarily textual in nature, regarding Drawings 80 of a patent application. This information may include the requirements for numbering, shading, suggestions for organization, etc. In the preferred embodiment, the Drawings 80 introductory material differs from other patent application drafting sections in that PatentPro™ does not provide a drafting screen for creating the drawings to be submitted with the patent application. PatentPro™ provides guidelines for creating the drawings and reminds the operator of drawings requirements useful in preparing at least provisional drawings to submit with a patent application. At the display of the introductory material for the Drawings 80, the Go Back 214, Sample Phrases 249, Technical Terminology 253, Legal Materials 277, and To Next Section 281 icons are active.

The Go Back 214, Legal Materials 277, and To Next Section 281 icons operates in a similar manner to that described above with regard to the Related Application 70 section, except that the information displayed is tailored to the drawings of a patent application. Upon operating the Sample Phrases 249 icon, the computer 10 causes to be displayed at display 12 several brief descriptions of drawings and, upon selecting a particular one, displays a sample drawing of the type selected, such as a perspective, exploded, plan, schematic, or other type of drawing. Upon operating the Technical Terminology 253 icon, there is shown at display 12 a listing of technical terminology many patent attorneys and agents find useful when describing, for example, relationships and various structures. In the preferred embodiment, the terms are organized in a Help file format grouped in a logical manner.

Upon continuing to the next section, the computer 10 causes to be displayed at display 12 introductory material, primarily textual in nature, for the Lists 90 section. The Lists 90 section differs from many of the other sections in that the Lists 90 section is a section not required or desired to be submitted to the Patent Office as part of the patent application. However, in accordance with an important aspect of the invention, the following lists are requested and stored in the computer 10, in an effort to help the user analyze the invention for which a patent application is being drafted. In addition, the information contained in the Lists 90 section will form the basis of sections of the patent application the operator will draft at a later time, as will be evident below.

The Lists 90 section contains four lists: Qualities and Benefits (QAB) 92; Primary Elements (PE) 94; Secondary Elements (SE); and Substitute Elements (SUB) 98. While these four lists are to carry out the preferred embodiment of the invention, it will be appreciated that any number of lists may be used for the substance of the analysis of the invention as described below. Further, the Lists 90 section may be omitted entirely and the substance of the analysis of the invention may be incorporated in other sections, for example the Claims 100, as appropriate. QAB 92 are the qualities and benefits of the invention for which a patent application is being drafted that differ from the qualities and benefits of other earlier technology, often termed prior art by patent attorneys and patent agents. The QAB 92 list may often be drafted by, pretending the operator is a sales person for the product or method, describing the benefits, advantages, and qualities of the invention that would lead a purchaser to purchase the invention over other technology otherwise available. The PE 94 list may be drafted by listing the elements of the invention that are responsible for the QAB 92, while making sure that the PE 94 define a complete, operative invention and define the invention in a way that does not also define the prior technology. The SE 96 list may be drafted by listing the elements of the invention that, while may not be necessary, may be of importance in a commercial or marketing manner. The SUB 98 list may be drafted by listing alternate ways in which to accomplish the objectives of the PE 92 and SE 94 listed elements. In this manner, the operator explores ways in which a potential competitor or copier may attempt to avoid or design around the invention. It will be understood that alternate ways of analyzing an invention may be utilized without departing for the present invention. The above is merely one illustrative embodiment for analysis of an invention and may be modified or incorporated into other sections without departing from the present invention.

After reading the introductory material for the Lists 90 section the computer causes to be displayed at display 12 a drafting screen 200 for the Lists 90 section. In the preferred embodiment, the drafting area 290 of the drafting screen 200 in the Lists 90 section includes four drafting area accessible through four tabs located towards the top portion of the drafting area 290. Upon selecting a tab, the drafting area for the respective list is displayed, along with a brief description of the purpose of each list QAB 92, PE 94, SE 96, and SUB 98. At the drafting screen 200 of the Lists 90 section, the Go Back 241, Patent Examples 245, Technical Terminology 253, To Introduction 277, and To Next Section 281 icons are active and each operate in a similar fashion to that described above, except tailored to the Lists 90 section.

Upon continuing to the next section, the computer 10 causes to be displayed at display 12 introductory material, primarily textual in nature, regarding the Claims 100 section of a patent application. After reading the introductory material, the computer displays a drafting screen 200 for the claims 100. Further, and in accordance with another aspect of the invention, the computer causes to be displayed at drafting area 290 first draft independent claims for the invention, one for each class of invention the operator chose and 20 the computer 10 stored at the Title 60 section. In the preferred embodiment, the first draft claim(s) is (are) created by presenting a portion of the title relating to each class of invention from the Title 60 section followed by the word(s) "comprising" for a machine, article of manufacture, or composition of matter, or "comprising the steps" for a process followed by the PE 94 list, with a semicolon (;), separating each element in the list, except that a semicolon (;) and the word "and" separates the last two elements in the PE 94 list. A period follows the last element in the PE 94 list. Each independent claim generated is assigned a separate alphabetical designation, e.g., the first independent claim is labeled A1 (which will have corresponding dependent claims A2, A3, A4, etc., if appropriate), the second independent claim is labeled B1 (which will have dependent claims B2, B3, B4, etc., if appropriate), etc.

At the draft screen 200 of the Claims 100 section, the Go Back 241, Patent Examples 245, Technical Terminology 253, Add-A-Claim 257, Show Lists 261, Legal Materials 273, To Introduction 277, and To Next Section 281 icons are active. The Go Back 241, Patent Examples 245, Technical Terminology 253, Legal Materials 273, To Introduction 277, and To Next Section 281 icons operate in a similar fashion as described above, except tailored to the Claims 100 section of a patent application.

Upon selecting the Add-A-Claim 257 icon, which may also be selected by a right mouse button depression in the preferred embodiment, a pull-down menu with the following choices appears: Add an independent claim; Add a dependent claim; and Help with adding claims. Upon choosing Help with adding claims, information, primarily textual in nature, is displayed helpful in understanding claims, their purpose, and using the Add-A-Claim 257 function. Upon choosing the Add an independent claim, the computer will present a first draft independent claim as described above, with the next in sequence alphabetical designation, such as C1. In the event the Title 60 section designated more than one class of invention, the operator is given the choice to create an independent claim for any one of the classes. Upon choosing Add a dependent claim, the computer causes to be displayed at display 12 a listing of each independent claim drafted previously. The operator then chooses which independent claim from which the new added claim will depend. After choosing the independent claim series, i.e., A1, B1, C1, etc., the computer 10 will display the independent claim and each dependent claim, if any, that have been previously drafted in the selected series. The operator may then choose the new dependent claim to be added to depend from any of the claims in the chosen claim series. After selecting the claim from which the new added claim will depend, the operator may the select from a number of transitional phrases such as "including", "further comprising", "further comprising the steps of", etc. The computer 10 then causes to be included in the drafting area 290 of drafting screen 200 of the Claims 100 section a dependent claim properly following in the selected claim series for the operator to complete.

In the preferred embodiment, the computer displays the Lists 90 upon selecting the Show Lists 261 icon in a split screen format so that the operator may see the QAB 92, PE 94, SE 96, and SUB 98 lists and highlight and drag the selected text into the Claims 100 section. In this manner the operator will properly imbed claims containing the elements of the invention that patent attorneys and patent agents often consider the most important.

Upon continuing to the next section, the computer 10 causes to be displayed at display 12 introductory information, primarily textual in nature, regarding an Abstract 110 of the disclosure section of a patent application. After reading the introductory material, the computer 10 causes to be displayed at display 12 a drafting screen 200 for the Abstract 110 section. The computer 10 presents a first draft abstract to the operator at drafting area 290 by selecting the most imbedded claim from the Claims 100 section and reproducing the independent claim in that series as well as all other claims from which the most imbedded dependent claim depends and the most imbedded dependent claim. The computer 10 automatically separates each new claim by a period and begins each new sentence with a capital letter. Further, the computer 10 substitutes the word "the" for "said" and removes the word "means". In addition, the computer adds the words "in the preferred embodiment" at the beginning of each new sentence. This procedure results in a first draft abstract from which the operator may modify and create a completed abstract.

At the drafting screen 200 for the Abstract 110, the Go Back 241, Patent Examples 245, Show Lists 261, Show Claims 265, Legal Materials 273, To Introduction 277, and To Next Section 281 icons are active. The Go Back 241, Patent Examples 245, Show Lists 261, Legal Materials 273, and To Introduction 277 icons operate in a similar fashion to that described above, except tailored to the Abstract 110 section for a patent application.

In the preferred embodiment, upon selecting the Show Claims 265 icon, the computer 10 causes to be displayed at display 12 the claims prepared and stored at the Claims 100 section of the patent application, and may be selected by highlighting and dragged to the drafting area 290 in the drafting screen 200 for the Abstract 110 section of the patent application. Upon selecting the To Next Section 281 icon, the computer counts the number of words in the drafting area 290 of the Abstract 110 and reminds the operator if there appears more than a set amount, e.g., for the U.S. Patent Office, a maximum of 250 words is preferred. If the maximum has been exceeded, the operator will be prompted to remove words from the drafting area 290 of the Abstract 110 by removing the more detailed description of the preferred embodiment or by removing some of the limitations appearing in the dependent claims. If the maximum has not been exceeded, the computer displays a checklist for the Abstract 110 section in a similar fashion as described above, except tailored to the Abstract 100 section of a patent application, and allows the operator to select the same options as described earlier from the checklist screen.

Upon continuing to the next section, the computer causes to be displayed at display 12 introductory material, primarily textual in nature, for the Background 120 section of a patent application. After reading the introductory material, the computer causes to be displayed a drafting screen 200 for the Background 120 section of a patent application. In the preferred embodiment, the drafting screen 200 displays three tabs at drafting area 290, one each for the History of the Technology of the invention, a description of the Prior technology, and the Deficiencies in the Prior Technology. Each tab is accompanied by a fixed text area reminding the operator of the purpose of each section. At the drafting screen for the Background 120 section of the patent application, the Go Back 241, Show Lists 261, Legal Materials 273, To Introduction 277, and To Next Section 281 icons are active. The Go Back 241, Show Lists 261, Legal Materials 273, To Introduction 277, and To Next Section 281 icons operate in a similar fashion as described above, except that each is tailored to the Background 120 section of a patent application.

Upon continuing to the next section, the computer causes to be displayed at display 12 introductory material, primarily textual in nature, for the Objects 130 of the invention section of a patent application. After reading the introductory material, the computer causes to be displayed at display 12 a drafting screen 200 for the Objects 130 of the invention. The computer 10 automatically generates a first draft Objects 130 section at drafting area 290 of the drafting screen 200 of the Objects 130 section by adding the phrase "The primary object of the invention is" and then presenting the first from the QAB 92 list; A modification such as "Another object of the invention is" precedes the second from the QAB 92 list; and so forth until all qualities and benefits from the QAB 92 list are incorporated into the first draft Objects 130 section of the invention. From there, the operator may modify the first draft until complete.

At the drafting screen 200 of the Objects 130 section the Go Back 241, Patent Examples 245, Legal Materials 273, To Introduction 277, and To Next Section 281 icons are active, and operate in a similar fashion as described above, except tailored to the Objects 130 section of the patent application.

Upon continuing to the next section, the computer causes to be displayed at display 12 introductory material, primarily textual in nature, for the Figures 140 section of a patent application, in which a brief description of the drawing is presented. After reading the introductory material, the computer causes to be displayed at display 12 a drafting screen 200 for the Figures 140 of the invention, at which the Go Back 241, Sample Phrases 249, Legal Materials 273, To Introduction 277, and To Next Section 281, are active and operate in a similar fashion as described above, except tailored to the Figures 140 section of a patent application. In addition to as described above, upon selecting a sample phrase, the computer will insert the phrase into the drafting area 290 of the drafting screen 200, with an indication of needed modification to complete the brief description of the drawings in the Figures 140 section of the patent application.

Upon continuing to the next section, the computer causes to be displayed at display 12 introductory material, primarily textual in nature, for the Summary 150 of the invention section of a patent application, in which a brief summary of the invention is presented. After reading the introductory material, the computer causes to be displayed at display 12 a drafting screen 200 for the Summary 150 of the invention, at which the Go Back 241, Patent Examples 245, Show Claims 265, Legal Materials 273, To Introduction 277, and To Next Section 281, are active and operate in a similar fashion as described above, except tailored to the Summary 150 section of a patent application.

Further, the computer 10 causes to be presented a first draft summary at the drafting area 290 of drafting screen 200 for the Summary 150 section. The first draft is generated having a paragraph corresponding to each independent claim from the Claims 100 section. The operator may then modify the first draft to complete the Summary 150 section of the patent application.

Upon continuing to the next section, the computer causes to be displayed at display 12 introductory material, primarily textual in nature, for the Field 160 section of a patent application, in which a brief field of the invention is presented. After reading the introductory material, the computer causes to be displayed at display 12 a drafting screen 200 for the Field 160 section of the invention, at which the Go Back 241, Patent Examples 245, Legal Materials 273, To Introduction 277, and To Next Section 281, are active and operate in a similar fashion as described above, except tailored to the Field 160 section of a patent application.

Further, the computer 10 causes to be presented a first draft field at the drafting area 290 of drafting screen 200 for the Field 160. The first draft is generated using the Title 160 section information, and indicates to the operator how to complete the Field 160 section of the patent application. The operator may then modify the first draft to complete the Field 160 section of the patent application.

Upon continuing to the next section, the computer causes to be displayed at display 12 introductory material, primarily textual in nature, for the Detailed Description 170 section of a patent application, in which a detailed description of the preferred embodiment of carrying out the invention is presented. After reading the introductory material, the computer causes to be displayed at display 12 a drafting screen 200 for the Detailed Description 170 section of the invention, at which the Go Back 241, Sample Phrases 249, Technical Terminology 253, Show Lists 261, Show Claims 265, Detailed Description Method 273, Legal Materials 273, To Introduction 277, and To Next Section 281, are active and operate in a similar fashion as described above, except tailored to the Field 160 section of a patent application. Upon selecting the Detailed Description Method 273 icon, a review of a method useful in organizing the detailed description is show. This method may be of a number of different methods, and in the preferred embodiment includes: Describing what is old and already known from the drawings; Characterizing what is new, using wording of the broadest independent claim; Describing in detail what is new, using the vocabulary established in the claims; Discussing the operation of the device or the flow of the method, including all of the alternative ways to practice the invention; Restating the advantages of the invention in a brief and succinct manner; and Defining broadly all critical terms.

Upon selecting the To Next Section 281 icon, the computer compares the words of the claims to the words in the Detailed Description 170 section and reminds the operator of any words in the claims not found in the detailed description, in an effort to remind the operator that the claims should find support in the detailed description. The operator is then given the option to go back to modify the detailed description in the drafting area 290 of the drafting screen 200, or proceed as described above. Upon proceeding, the computer displays a checklist for the Detailed Description 170 section in a similar fashion as described above, except tailored to the Detailed Description 170 section of a patent application, and allows the operator to select the same options as described earlier from the checklist screen.

Upon continuing to the next section, the computer generates a first draft completed patent application and displays at display 12 the application for the operator to modify, if necessary. In the preferred embodiment, the computer automatically inserts at the appropriate places, standard phrases, paragraphs and formatting, as used by many patent attorneys and patent agents. Further, the completed draft application incorporates a footer indicative of the inventor names as inputted and stored at the Inventor 50 section and page number.

It will be recognized by those in the art that the invention may be modified to incorporate the patent laws and rules of any foreign country, and may be modified to be used in plant and design patents. Further the embodiment may be modified to be used in presenting any inventive idea whether patentable or not.

Further, it will be appreciated that certain sections may not be drafted at all or may be drafted in an order other than that described above and still be within the scope of the invention. For example, the Related Application 70, and Inventor 50 sections may be drafted at any time. In addition, dependent claims may not be necessary and may be omitted entirely. Further, certain sections may not be required by the Patent Office, or patent offices of foreign countries. These sections, such as the Background of the invention 120 and Objects 130 may therefore be omitted without departing from the scope of the present invention. It will be understood that if the Objects 130 is omitted, the QAB 92 list may also be omitted. The foregoing embodiments are merely illustrative of the possible embodiments.

The full scope of the invention is defined only by the issued claims.

What is claimed is:

1. A machine for drafting a patent application having at least sections including claims, a summary of the invention, an abstract of the disclosure, and a detailed description of a preferred embodiment of the invention, said machine comprising:

one or more input devices, one or more output devices, and a computer with memory for receiving and storing data from the input devices, transmitting data to the output devices, and storing program steps for program control and manipulating data in memory;

the computer, through input and output devices, requests and stores primary elements (PE) of the invention that define the invention apart from prior technology before the claims are drafted;

the claims are drafted before the summary of the invention, abstract, and the detailed description of a preferred embodiment of the invention is drafted; and the computer requires drafting the sections in a predetermined order prohibiting jumping ahead to draft a latter section.

2. A machine as claimed in claim 1 further comprising:

the computer, through input and output devices, requests and, if appropriate, stores information regarding the invention further including at least 4) qualities and benefits (QAB) of the invention over the prior technology wherein the QAB are requested and stored before objects of the invention are drafted.

3. A machine as claimed in claim 2 wherein the computer creates a draft objects of the invention based on the qualities of benefits.

4. A machine as claimed in claim 1 wherein the computer creates a draft independent claim based on the primary elements.

5. A machine as claimed in claim 1 wherein the computer creates a draft summary of the invention based on at least the primary elements.

6. A machine as claimed in claim 1 wherein the computer creates a draft abstract of the disclosure based on at least the primary elements and secondary elements.

7. A machine as claimed in claim 1 wherein the computer compiles a draft completed patent application based on the sections and predetermined text.

8. A machine as claimed in claim 1 wherein the computer further requests and stores secondary elements (SE) of the invention that are important but not necessary to define over the prior technology.

9. A machine as claimed in claim 8 wherein the computer further requests and stores substitute elements (SUB) of the invention that substitute or modify the PE or SE in an effort to avoid but not depart from the invention.

10. A method by computer for drafting a patent application having at least sections including claims, a summary of the invention, an abstract of the disclosure, and a detailed description of a preferred embodiment of the invention, said method comprising the steps of:

requesting and storing primary elements (PE) of the invention that define the invention apart from prior technology before drafting the claims;

drafting the claims before drafting the summary of the invention, abstract, and the detailed description of a preferred embodiment of the invention; and drafting the sections in a predetermined order prohibiting jumping ahead to draft a latter section.

11. A method as claimed in claim 10 further comprising the step of:

requesting and, if appropriate, storing information regarding the invention further including at least 4) qualities and benefits (QAB) of the invention over the prior technology wherein the QAB are requested and stored before drafting objects of the invention.

12. A method as claimed in claim 11 wherein a computer creates a draft objects of the invention based on the qualities of benefits.

13. A method as claimed in claim 10 wherein a computer creates a draft independent claim based on the primary elements.

14. A method as claimed in claim 10 wherein a computer creates a draft summary of the invention based on at least the primary elements.

15. A method as claimed in claim 10 wherein a computer creates a draft abstract of the disclosure based on at least the primary elements and secondary elements.

16. A method as claimed in claim 10 wherein a computer compiles a draft completed patent application based on the sections and predetermined text.

17. A method as claimed in claim 10 further comprising the step of:

requesting and storing secondary elements of the invention that are important but not necessary to define over the prior technology.

18. A method as claimed in claim 17 further comprising the step of:

requesting and storing substitute elements (SUB) of the invention that substitute or modify the PE or SE in an effort to avoid but not depart from the invention.

* * * * *